United States Patent
Savolainen et al.

(10) Patent No.: US 10,642,968 B2
(45) Date of Patent: May 5, 2020

(54) CONTROLLING A DEVICE

(71) Applicant: Nokia Technologies Oy, Espoo (FI)

(72) Inventors: Teemu Illmari Savolainen, Tampere (FI); Antti Veli Rantaeskola, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 170 days.

(21) Appl. No.: 15/512,277

(22) PCT Filed: Sep. 24, 2014

(86) PCT No.: PCT/FI2014/050724
§ 371 (c)(1),
(2) Date: Mar. 17, 2017

(87) PCT Pub. No.: WO2016/046446
PCT Pub. Date: Mar. 31, 2016

(65) Prior Publication Data
US 2017/0277882 A1 Sep. 28, 2017

(51) Int. Cl.
*H04L 9/00* (2006.01)
*G06F 21/43* (2013.01)
(Continued)

(52) U.S. Cl.
CPC ............ *G06F 21/43* (2013.01); *H04L 9/0643* (2013.01); *H04L 9/3215* (2013.01); *H04L 9/3236* (2013.01); *H04L 9/3242* (2013.01); *H04L 12/28* (2013.01); *H04L 29/06* (2013.01); *H04L 63/0492* (2013.01); *H04L 63/123* (2013.01);
(Continued)

(58) Field of Classification Search
USPC .......................................................... 726/4
See application file for complete search history.

(56) References Cited

U.S. PATENT DOCUMENTS 7,650,509 B1  1/2010  Dunning
8,347,370 B2  1/2013  Headley
(Continued)

FOREIGN PATENT DOCUMENTS

CN    1321386 A    11/2001
CN    1829153 A    9/2006
(Continued)

OTHER PUBLICATIONS

"Same-Origin policy", Wikipedia, Retrieved on Apr. 7, 2017, Webpage available at: https://en.wikipedia.org/wiki/Same-origin_policy.
(Continued)

*Primary Examiner* — Christopher J Brown
(74) *Attorney, Agent, or Firm* — Squire Patton Boggs (US) LLP

(57) ABSTRACT

In accordance with an example aspect of the present invention, there is provided an apparatus comprising at least one receiver configured to receive, via a first channel, a secret value and an identifier of a local node and, via a second channel, a random value, and at least one processing core configured to cause transmission to the local node of a first message comprising a hash value, the hash value being derived based on a set comprising the secret value, the random value, and an instruction.

16 Claims, 6 Drawing Sheets

(51) Int. Cl.
| | |
|---|---|
| *H04L 29/06* | (2006.01) |
| *H04L 9/32* | (2006.01) |
| *H04W 4/80* | (2018.01) |
| *H04W 4/70* | (2018.01) |
| *H04W 12/00* | (2009.01) |
| *H04L 9/06* | (2006.01) |
| *H04L 12/28* | (2006.01) |
| *H04W 84/18* | (2009.01) |

(52) U.S. Cl.
CPC .............. *H04L 63/18* (2013.01); *H04W 4/70* (2018.02); *H04W 4/80* (2018.02); *H04W 12/003* (2019.01); *H04W 84/18* (2013.01)

(56) References Cited

U.S. PATENT DOCUMENTS

| | | | |
|---|---|---|---|
| 8,639,391 | B1 | 1/2014 | Alberth, Jr. et al. |
| 8,713,701 | B2 | 4/2014 | Pammaraju |
| 2005/0203582 | A1* | 9/2005 | Healy ................. A61N 1/37211 607/31 |
| 2005/0253717 | A1 | 11/2005 | Howarth et al. |
| 2006/0112171 | A1 | 5/2006 | Rader |
| 2007/0156876 | A1 | 7/2007 | Sundarrajan et al. |
| 2008/0120439 | A1 | 5/2008 | Kwan et al. |
| 2009/0112769 | A1 | 4/2009 | Dicks et al. |
| 2011/0126010 | A1 | 5/2011 | Kim et al. |
| 2012/0079582 | A1 | 3/2012 | Brown et al. |
| 2012/0278624 | A1* | 11/2012 | Hamada ................... G09C 5/00 713/168 |
| 2012/0280801 | A1 | 11/2012 | Muratsu |
| 2013/0010954 | A1 | 1/2013 | Falk et al. |
| 2013/0038425 | A1 | 2/2013 | Sugiyama et al. |
| 2013/0080898 | A1 | 3/2013 | Lavian et al. |
| 2013/0090773 | A1 | 4/2013 | Park et al. |
| 2013/0097274 | A1 | 4/2013 | Moss |
| 2013/0211622 | A1 | 8/2013 | Carney et al. |
| 2013/0238744 | A1 | 9/2013 | Paschke et al. |
| 2013/0241743 | A1 | 9/2013 | Loic |
| 2013/0298642 | A1 | 11/2013 | Gillette, II |
| 2014/0047322 | A1 | 2/2014 | Kim et al. |
| 2014/0304381 | A1 | 10/2014 | Savolainen et al. |
| 2015/0006695 | A1* | 1/2015 | Gupta ...................... H04L 41/32 709/223 |

FOREIGN PATENT DOCUMENTS

| | | |
|---|---|---|
| CN | 101217563 A | 7/2008 |
| CN | 101267626 A | 9/2008 |
| CN | 10053183 C | 8/2009 |
| CN | 101977543 A | 2/2011 |
| CN | 102281251 A | 12/2011 |
| CN | 102316606 A | 1/2012 |
| CN | 102404413 A | 4/2012 |
| CN | 102571702 A | 7/2012 |
| CN | 102652445 A | 8/2012 |
| CN | 103200570 A | 7/2013 |
| CN | 203219496 U | 9/2013 |
| EP | 2683146 A1 | 1/2014 |
| WO | 2005/083927 A1 | 9/2005 |
| WO | 2006/055484 A1 | 5/2006 |
| WO | 2013/038230 A1 | 3/2013 |
| WO | 2013/057493 A1 | 4/2013 |
| WO | 2013/063381 A1 | 5/2013 |
| WO | 2013/119730 A1 | 8/2013 |
| WO | 2014/024078 A1 | 2/2014 |
| WO | 2014/072725 A1 | 5/2014 |
| WO | 2014076927 A1 | 5/2014 |
| WO | 2014/096505 A1 | 6/2014 |
| WO | 2015/088481 A1 | 6/2015 |

OTHER PUBLICATIONS

"System Applications Working Group Charter", W3C, Retrieved on Apr. 7, 2017, Webpage available at: https://www.w3.org/2012/09/sysapps-wg-charter.html.

"Webstorage", HTML, Retrieved on Apr. 7, 2017, Webpage available at : https://html.spec.whatwg.org/multipage/webstorage.html.

"About HTML5 WebSocket", Websocket.org, Retrieved on Apr. 7, 2017, Webpage available at: http://www.websocket.org/aboutwebsocket.html.

"Network Service Discovery", W3C, Retrieved on Apr. 7, 2017, Webpage available at : https://dvcs.w3.org/hg/dap/raw-file/tip/discovery-api/Overview.html#dfn-http-response.

"Network Service Discovery Api Support in Opera", Dev.Opera, Retrieved on Apr. 7, 2017, Webpage available at : https://dev.opera.com/articles/network-service-discovery-api/.

"Web Intents", Wikipedia, Retrieved on Apr. 7, 2017, Webpage available at : https://en.wikipedia.org/wiki/Web_Intents.

"Copper (Cu): Add-ons for Firefox", Mozilla Add-Ons, Retrieved on Apr. 7, 2017, Webpage available at : https://addons.mozilla.org/en-us/firefox/addon/copper-270430/.

"Cross-origin resource sharing", Wikipedia, Retrieved on Apr. 7, 2017, Webpage available at : https://en.wikipedia.org/wiki/Cross-origin_resource_sharing.

"Near field communications (NEC)", W3C, Retrieved on Apr. 7, 2017, Webpage available at :https://www.w3.org/wiki/Near_field_communications_(NFC).

"LazarSoft/jsqrcode", Github, Retrieved on Apr. 7, 2017, Webpage available at :https://github.com/LazarSoft/jsqrcode.

"XMLHttpRequest", Wikipedia, Retrieved on Apr. 7, 2017, Webpage available at : https://en.wikipedia.org/wiki/XMLHttpRequest.

"Cross-site xmlhttprequest with CORS", Hacks, Retrieved on Apr. 7, 2017, Webpage available at :https://hacks.mozilla.org/2009/07/cross-site-xmlhttprequest-with-cors/.

"Using CORS", HTML5 Rocks, Retrieved on Apr. 7, 2017, Webpage available at : https://www.html5rocks.com/en/tutorials/cors/.

Castellani et al., "Best Practices for HTTP-CoAP Mapping Implementation", draft-castellani-core-http-mapping-07, Core Working Group, Feb. 25, 2013, pp. 1-16.

Vial, "CoRE Mirror Server", draft-vial-core-mirror-proxy-01, Jul. 13, 2012, pp. 1-20.

"CORS Access-Control-Allow-Origin despite correct headers", Stackoverflow, Retrieved on Apr. 7, 2017, Webpage available at : http://stackoverflow.com/questions/9613210/cors-access-control-allow-origin-despite-correct-headers.

"CORS Enabled", W3C, Retrieved on Apr. 7, 2017, Webpage available at : https://www.w3.org/wiki/CORS_Enabled.

International Search Report and Written Opinion received for corresponding Patent Cooperation Treaty Application No. PCT/FI2013/050540, dated Sep. 12, 2013, 8 pages.

Shelby et al., "Constrained Application Protocol (COAP)", draft-ietf-core-coap-18, Core Working Group, Jun. 28, 2013, pp. 1-118.

Savolainen et al., "CoAP over WebSockets", draft-savolainen-core-coap-websockets-01, Core Working Group, Oct. 18, 2013, pp. 1-18.

Dodson et al., "Micro-interactions with NFC-enabled Mobile Phones", MobiCase, 2011, pp. 1-20.

Shelby et al., "The Constrained Application Protocol (CoAP)", RFC 7252, IETF, Jun. 2014, pp. 1-97.

Savolainen et al., "CoAP over WebSockets", draft-savolainen-core-coap-websockets-02, Core Working Group, Apr. 10, 2014, pp. 1-15.

"Security token", Wikipedia, Retrieved on Mar. 21, 2017, Webpage available at : https://en.wikipedia.org/wiki/Security_token.

"CoAP Option for Authentication Token", IETF, Retrieved on Mar. 21, 2017, Webpage available at : https://www.ietf.org/mail-archive/web/core/current/msg05445.html.

"Re: [core] CoAP Option for Authentication Token", IETF, Retrieved on Mar. 21, 2017, Webpage available at :https://www.ietf.org/mail-archive/web/core/current/msg05447.html.

Keoh et al., "Securing the Internet of Things: A Standardization Perspective", IEEE Internet of Things Journal, vol. 1, No. 3, Jun. 2014, pp. 265-275.

Kent et al., "Secure Communication via Shared Knowledge and a Salted Flash in Ad-hoc Environments", IEEE Annual Computer Software and Applications Conference Workshops, Jul. 18-22, 2011, pp. 122-127.

(56) References Cited

OTHER PUBLICATIONS

Briseno et al., "Using RFID/NFC and QR-code in Mobile Phones to Link the Physical and the Digital World" Interactive Multimedia, Mar. 7, 2012, pp. 219-243.
Huang, "Web Technologies for the Internet of Things", Thesis, Jul. 7, 2013, pp. 1-66.
International Search Report and Written Opinion received for corresponding Patent Cooperation Treaty Application No. PCT/IB2014/058291, dated Nov. 7, 2014, 19 pages.
Lee et al., "The Internet of Things-Concept and Problem Statement", draft-Iee-iot-problem-statement-05.txt, IRTF, Jul. 30, 2012, pp. 1-19.
Non-Final Office action received for corresponding U.S. Appl. No. 15/108,568, dated Mar. 23, 2017, 10 pages.
International Search Report and Written Opinion received for corresponding Patent Cooperation Treaty Application No. PCT/FI2014/050724 dated Apr. 27, 2015, 14 pages.
Extended European Search Report received for corresponding European Patent Application No. 14878737.7, dated Jun. 6, 2017, 12 pages.
Final Office action received for corresponding U.S. Appl. No. 15/108,568, dated Jul. 28, 2017, 11 pages.
Non-Final Office action received for corresponding U.S. Appl. No. 15/108,568, dated Nov. 7, 2017, 10 pages.
Extended European Search Report received for corresponding European Patent Application No. 14902683.3, dated Feb. 6, 2018, 6 pages.
Non-Final Office action received for corresponding U.S. Appl. No. 14/891,970, dated Feb. 22, 2018, 13 pages.
Office action received for corresponding European Patent Application No. 14878737.7, dated Mar. 21, 2018, 8 pages.
Office action received for corresponding Chinese Patent Application No. 201380078302.4, dated Apr. 28, 2018, 7 pages of office action and no page of translation available.
Office action received for corresponding European Patent Application No. 13728776.9, dated Jun. 21, 2018, 7 pages.
Final Office action received for corresponding U.S. Appl. No. 14/891,970, dated Aug. 27, 2018, 14 pages.
Office action received for corresponding Chinese Patent Application No. 201480073085.4, dated Sep. 25, 2018, 7 pages of office action and no page of translation available.
Office action received for corresponding Chinese Patent Application No. 201380078302.4, dated Jan. 11, 2019, 3 pages of office action and no page of translation available.
Office action received for corresponding European Patent Application No. 14902683.3, dated Feb. 8, 2019, 4 pages.
Communication pursuant to Article 94(3) EPC issued in corresponding European Patent Application No. 14902683.3, dated Jun. 21, 2019.
First Office Action issued in corresponding Chinese Patent Application No. 2014800822841, dated Jun. 5, 2019, with partial English translation.
Chinese Office Action corresponding to CN Appln. No. 201480082284.1, dated Dec. 12, 2019.

\* cited by examiner

CONTROLLING A DEVICE

RELATED APPLICATION

This application was originally filed as Patent Cooperation Treaty Application No. PCT/FI2014/050724 filed Sep. 24, 2014.

FIELD OF INVENTION

The present invention relates to the field of signalling between electrically operated devices, to control them.

BACKGROUND OF INVENTION

Interacting with distributed systems may take place in a variety of ways. In an Ethernet network, for example, devices are interconnected by the network and accessible to each other in a straightforward way. In the Internet, in contrast, messaging between devices may take place using internet protocol, IP, addressing and domain names. For example, a node may inquire for an IP address of a desired correspondent node based on a known domain name. Such an inquiry may be addressed to the domain name system, DNS. By updating to DNS, even changing IP addresses can be handled without interrupting connectivity.

Sensor networks may comprise sensor nodes interconnected with each other. Sensor nodes may be configured to communicate with each other and to provide sensor information to further nodes not comprised in the sensor network. To this end, a sensor network may have an internal addressing system distinct from an external IP network. At least one node in the sensor network may be either addressable from outside the sensor network, or be configured to provide information to a node external to the sensor network.

In the Internet of Things, IoT, scheme it is envisioned that a large number of identifiable devices, or nodes, can be communicated with based on an addressing scheme that may depend on the situation and application in question. To enable the large number of identifiable devices being connected to the IoT, addressing in accordance with internet protocol version 6, IPv6, is envisioned instead of the more limited IPv4 as IP addresses might otherwise run out. On the other hand, using network address translation, NAT, IPv4 addressing may be extended and the scarcity of IPv4 addresses alleviated, with an impact on usability that may vary depending on what kind of communication is desired.

Some IoT nodes are foreseen to have limitations in hardware and energy resources. For example, such nodes may be furnished with only limited memory capacity, they may operate on small batteries and/or they may have only modest processor capability. To enable their use in networking, protocols such as the constrained application protocol, CoAP, have been designed. CoAP has been standardized by the Internet Engineering Task Force.

SUMMARY OF THE INVENTION

In accordance with a first aspect of the present invention, there is provided an apparatus comprising at least one receiver configured to receive, via a first channel, a secret value and an identifier of a local node and, via a second channel, a random value, and at least one processing core configured to cause transmission to the local node of a first message comprising a hash value, the hash value being derived based on a set comprising the secret value, the random value, and an instruction.

Various embodiments of the first aspect may comprise at least one feature from the following bulleted list:

the at least one processing core is configured to derive the hash value the at least one receiver is further configured to receive, over the first channel, a pin code, and to derive the hash value based further on the pin code the first channel comprises a Bluetooth channel, a Bluetooth low-energy channel, a near field communication channel, an infra-red channel or a visual pattern recognition channel the second channel comprises a websocket channel, a hypertext transport protocol channel, a constrained application protocol channel, extensible messaging and presence protocol, message queue telemetry transport, alljoyn or hypertext transport protocol channel 2.0 channel the at least one processing core is configured to cause the first message to be transmitted via the second channel the at least one processing core is further configured to cause transmission of a second message to the local node, the second message comprising a second hash value, the second hash value being derived based on a set comprising the secret value, a second random value, and a second instruction, the second random value being received in the apparatus from the local node at least in part as a response to the first message the at least one receiver is further configured to receive, via the first channel, an identifier of a network node and the at least one processing core is configured to request, from the network node, control software configured to cause controlling of the local node, wherein the request comprises the identifier of the local node the identifier of the local node comprises an internet protocol address of the local node, a fully qualified domain name of the local node or a pointer to a websocket proxy the at least one processing core is configured to process, in the apparatus, an indication concerning whether it is necessary to include the instruction in the message.

In accordance with a second aspect of the present invention, there is provided an apparatus comprising at least one processing core and at least one memory including computer program code, the at least one memory and the computer program code being configured to, with the at least one processing core, cause the apparatus at least to store a secret value associated with the apparatus, transmit to a node a random value, receive a message from the node, the message comprising a first hash value, verify the hash value by deriving a comparative hash value based on a set comprising the secret value, an instruction, and the random value, responsive to the comparative hash value matching the first hash value, cause the apparatus to act on the instruction, and transmit to the node a second random value.

Various embodiments of the second aspect may comprise at least one feature from the following bulleted list:

the message comprises, in addition to the first hash value, the instruction the at least one memory and the computer program code are configured to, with the at least one processing core, cause the apparatus to provide the secret value to the node over a first channel, and to receive the message from the node over a second channel the at least one memory and the computer program code are configured to, with the at least one processing core, cause the apparatus to derive the comparative hash value based at least in part on a pin code provided to the node from the apparatus via the first channel the at least one memory and the computer program code are configured to, with the at least one processing core, cause the apparatus to periodically change the secret value the at least one memory and the computer program code are configured to, with the at least one processing core, cause the apparatus to derive, after transmitting the random value to the node, at least two comparative hash values using at least two possible values for the instruction the at least one memory and the computer program code are configured to, with the at least one processing core, cause the apparatus to transmit to the node a second random value responsive to receipt of the message.

In accordance with a third aspect of the present invention, there is provided a method comprising receiving, via a first channel, a secret value and an identifier of a local node and, via a second channel, a random value, and causing transmission to the local node of a first message comprising a hash value, the hash value being derived based on a set comprising the secret value, the random value, and an instruction.

Various embodiments of the third aspect may comprise at least one feature corresponding to a feature from the preceding bulleted list laid out in connection with the first aspect.

In accordance with a fourth aspect of the present invention, there is provided a method, comprising storing a secret value associated with an apparatus, transmitting to a node a random value, receiving a message from the node, the message comprising a first hash value, verifying the first hash value by deriving a comparative hash value based on a set comprising the secret value, an instruction, and the random value, responsive to the comparative hash value matching the first hash value, causing the apparatus to act on the instruction, and transmitting to the node a second random value.

Various embodiments of the fourth aspect may comprise at least one feature corresponding to a feature from the preceding bulleted list laid out in connection with the second aspect.

In accordance with a fifth aspect of the present invention, there is provided an apparatus comprising means for receiving, via a first channel, a secret value and an identifier of a local node and, via a second channel, a random value, and means for causing transmission to the local node of a first message comprising a hash value, the hash value being derived based on a set comprising the secret value, the random value, and an instruction.

In accordance with a sixth aspect of the present invention, there is provided an apparatus, comprising means for storing a secret value associated with the apparatus, means for transmitting to a node a random value, means for receiving a message from the node, the message comprising a first hash value, means for verifying the hash value by deriving a comparative hash value based on a set comprising the secret value, an instruction, and the random value, means for causing the apparatus to act on the instruction responsive to the comparative hash value matching the first hash value, and means for transmitting to the node a second random value.

In accordance with a seventh aspect of the present invention, there is provided a non-transitory computer readable medium having stored thereon a set of computer readable instructions that, when executed by at least one processor, cause an apparatus to at least receive, via a first channel, a secret value and an identifier of a local node and, via a second channel, a random value, and cause transmission to the local node of a first message comprising a hash value, the hash value being derived based on a set comprising the secret value, the random value, and an instruction.

In accordance with an eighth aspect of the present invention, there is provided a non-transitory computer readable medium having stored thereon a set of computer readable instructions that, when executed by at least one processor, cause an apparatus to at least store a secret value associated with the apparatus, transmit to a node a random value, receive a message from the node, the message comprising a first hash value, verify the hash value by deriving a comparative hash value based on a set comprising the secret value, an instruction, and the random value, responsive to the comparative hash value matching the first hash value, cause the apparatus to act on the instruction, and transmit to the node a second random value.

INDUSTRIAL APPLICABILITY

At least some embodiments of the present invention find industrial application in secured control of local devices.

DETAILED DESCRIPTION OF EXAMPLE EMBODIMENTS

A node may be built with low memory and/or processing requirements using embodiments of the invention described herein. By providing a secret value over a first channel to be used over communications over a second channel, access may be restricted to units having physical access to the node. A distinct random value may be employed for each message to prevent replay attacks. Instructions may be hashed together with the secret and random values to enable the node to verify them in a resource-efficient way, so that a cryptographic communication protocol such as transport layer security, TLS, needn't be implemented, for example.

Figure 1:
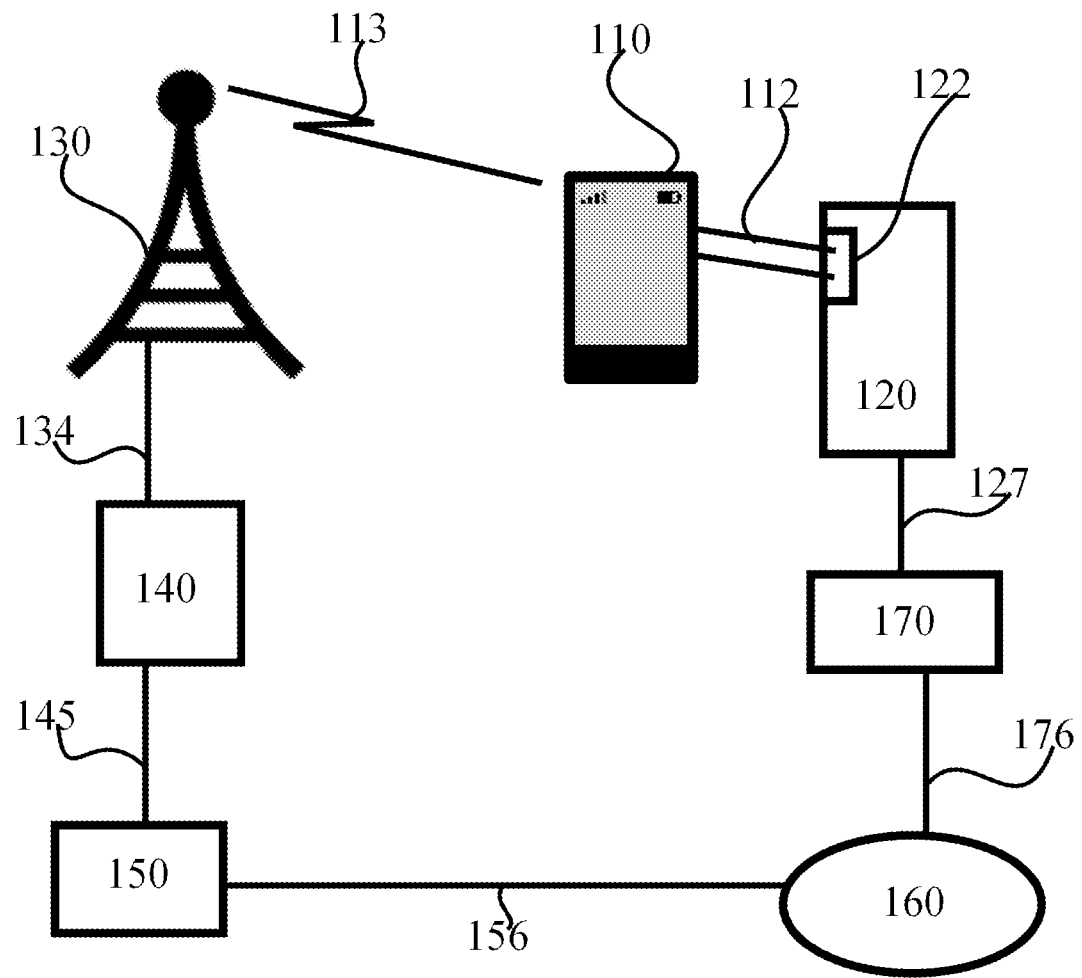
FIG. 1 illustrates an example system capable of supporting at least some embodiments of the present invention.

FIG. 1 illustrates an example system capable of supporting at least some embodiments of the present invention. The system of FIG. 1 comprises device 110, which may comprise a smartphone, cellular phone, tablet device, phablet device, laptop or desktop computer, or other suitable electronic device, for example. Device 110 may comprise a user interface, which may comprise a touchscreen user interface or a keypad plus display user interface, for example.

Local node 120 may comprise, for example, a sensor, a light control, a home automation control device or other suitable electronic device. Local node 120 is in the example of FIG. 1 connected to gateway 170 via connection 127. Connection 127 may comprise a wire-line connection or at least in part a wireless connection. Gateway 170 is connected to network 160 via connection 176. Network 160 may comprise the Internet or another suitable network, such as for example a corporate network. In some embodiments, local node 120 is directly connected to network 160 via connection 127, and gateway 170 is absent.

In the system of FIG. 1, device 110 is communicatively coupled to base station 130 via link 113. Base station 130 may be configured to operate in accordance with at least one wireless technology, such as wideband code division multiple access, WCDMA, long term evolution, LTE, IS-95 or wireless local area network WLAN, which is also known as Wi-Fi. Link 113 conforms to a technology that base station 130 and device 110 are configured to support. Link 113 may be two-way in that it may comprise a downlink for transferring information from base station 130 to device 110, and an uplink for transferring information from device 110 to base station 130. In case base station 130 only supports WLAN and not a cellular technology such as WCDMA or IS-95, it may alternatively be known as an access point but in the present document, the term base station is used throughout for clarity. In some embodiments, instead of a wireless link, link 113 comprises a wire-line link with a communication node that is communicatively coupled with network 160.

In the system of FIG. 1, base station 130 is communicatively coupled, via connection 134, to network node 140. Network node 140 may comprise a radio network controller, switch or other network node. Network node 140 is communicatively coupled, via connection 145, to gateway 150. Gateway 150 in turn is connected to network 160 via connection 156. Each of connections 134, 145 and 156 may be wire-line or at least in part wireless. Not all of connections 134, 145 and 156 need to be of the same type. In some embodiments, network node 140 and/or gateway 150 are absent, leaving base station 130 in more direct contact with network 160.

In addition to link 113 with base station 130, device 110 is enabled to receive information from local node 120 via local link 112. Local link 112 may comprise a near-field communication, NFC, Bluetooth, Bluetooth LE or optical link, for example. An optical link may comprise an infrared link, or an optical link may comprise that device 110 uses a camera comprised in device 110 to algorithmically recognize information that local node 120 displays, either permanently printed thereon on displayed on a display 122 comprised in local node 120. Display 122 may be a monochrome liquid-crystal display or an organic light emitting diode, OLED, display, for example. In general, local link 112 enables device 110 to obtain information from local node 120 when device 110 is physically near local node 120. Near may comprise within a radius of 5 or 10 meters, for example. Display 122 is absent in some embodiments.

In general it may be considered that local link 112 comprises a first channel and link 113 comprises a second channel. The first channel is therefore a local-range channel. The first and second channels may be based on different technologies. Device 110 is capable of receiving information from local node 120 via both channels, in the case of local link 112 directly and in the case of link 113 via gateway 170, network 160, gateway 150, network node 140 and base station 130. In some embodiments, local link 112, comprising the first channel, is two-way whereas in other embodiments it is one-way in the sense that device 110 can receive information over it, but not transmit information over it to local node 120.

In use, device 110 may be configured to obtain information from local node 120 over local link 112. Such information may comprise, for example, a secret value. The secret value may be expressed in binary, hexadecimal or decimal format, for example. The information may further comprise an identifier of local node 120. The information may further comprise a pin code. The information may further comprise an identifier of a network node. An identifier may comprise a uniform resource locator, URL, or uniform resource identifier, URI, for example. The network node the identifier of the network node relates to may comprise network node 140 or another network node, such as for example a server. Likewise the identifier of local node 120 may comprise, for example, a URL or URI of local node 120.

Device 110 may fetch from the network node identified by the identifier of the network node control software configured to control, at least in part, local node 120. Device 110 may fetch this software by requesting, over link 113, the software from the identified network node. Such a request may comprise, or be at least in part based on, the identifier of the network node obtained in device 110 from local node 120. Such a request may comprise the identifier of local node 120. Device 110 may responsively receive the control software. The control software may comprise, for example, a control panel. The control software may comprise, for example, JavaScript software. The fetching and obtaining of the control software may be based on secure hypertext transfer protocol, HTTPS, for example. In embodiments where device 110 has software needed to control, at least in part, local node 120 the fetching of the control software may be absent, or may comprise only updating the control software to a newer version. In some embodiments, device 110 does not need specific control software to control, at least in part, local node 120 so fetching such software is not done.

Device 110 is configured to open a connection to local node 120. The connection may traverse base station 130, network node 140, gateway 150, network 160 and gateway 170, for example. In general the connection may be opened over the second channel. The connection may comprise a maintained state in at least one node enabling delivery of messages between device 110 and local node 120. The connection may comprise a Websocket, CoAP or hypertext transfer protocol, HTTP, connection, for example. The connection may be a non-cryptographic connection in that data communicated over the connection is not encrypted by the connection protocol.

Websocket connections may be run with limited resources, making it a useful option where local node 120 is resource-constrained. The set-up of the connection comprises exchange of at least one message between device 110 and local node 120. The Websocket protocol has been standardized in the internet engineering task force, IETF. Local node 120 may transmit, for example in a message comprised in the connection set-up process on in another message, to device 110 a random value local node 120 has generated. Local node 120 may store a copy of the random value in a memory comprised in local node 120. The random value may be expressed in binary, hexadecimal or decimal format, for example. Local node 120 may use a software-based random number generator, or local node 120 may at least in part use a hardware-based random value generation process. An example of a hardware element usable for generating random values is a thermal noise random number generator.

Being in receipt of the random value and the secret value, device 110 may transmit an instruction to local node 120. The instruction may be comprised in a first message transmitted from device 110 to local node 120, for example. The instruction may comprise, for example, an instruction to turn off air conditioning in case local node 120 is a home automation control device. Another example is an instruction to provide to device 110 a measurement of atmospheric pressure in case local node 120 is a sensor node equipped with a barometer.

Device 110 may be configured to compute a hash, such as for example a rolling hash or a secure hash, of a set of data that comprises the secret value, the random value and the instruction. In general, the hash function used can be a cryptographic hash function. Where device 110 obtained a pin code over the first channel, the pin code may be included in the input to the hash function as well. Device 110 may provide the output of the hash function, known simply as the hash value or the hash, to local node 120 in a message. The message may further comprise the instruction separately from the hash.

Once in receipt of the message, local node 120 may verify the hash is correct by deriving a hash of the secret value, the random value, the instruction and in case a pin code is used, the pin code. In case the derived hash is the same as the hash received in the message, the hash is correctly verified. In case the hashes fail to match, local node 120 may be configured to discard the message, and/or provide over the connection an error signal to device 110.

In some embodiments the message comprising the hash from device 110 to local node 120 needn't separately comprise the instruction. In these embodiments, the number of possible instructions is limited, and local node 120 may pre-calculate, after sending the random value to device 110, hashes of the secret value, the random value and each of the possible instructions. In embodiments where a pin code is used, the pin code is also used in pre-calculating the hashes. These pre-calculated hashes may be stored in memory of local node 120, and local node 120 may verify the hash it receives from device 110 by comparing it with the pre-calculated hashes until a match is found, in which case the received hash is thereby verified and the instruction may be acted on, since local node 120 will know which instruction was used in deriving the hash that matches the one received from device 110. In case the received hash matches none of the stored, pre-calculated hashes, verification fails and local node 120 may discard the message, and/or provide over the connection an error signal to device 110. Using pre-calculated hashes reduces latency as the hash needn't be derived only after receipt of the message from device 110. Pre-calculating may be done after transmission of the random value toward device 110, for example responsive to transmission of the random value toward device 110.

In some embodiments, local node 120 is configured to begin pre-calculating hashes after transmitting the random value to device 110, but may continue deriving hashes with possible instructions after receiving a message from device 110 comprising a hash. This may be the case, for example, where local node 120 doesn't have the time to completely pre-calculate the hashes by the time device 110 sends its message with the hash. Alternatively, the pre-calculation process in local node 120 may have low priority, which may cause it to proceed slowly. In some embodiments, post-calculation is performed instead of pre-calculation, wherein local node 120 begins deriving hashes with possible instructions, one by one, responsive to receiving from device 110 the message comprising the hash. This way, local node 120 may stop deriving the hashes responsive to a determination that one of the hashes derived in local node 120 matches the one received from device 110.

In embodiments where local node performs pre-calculation and/or post-calculation of hashes, and device 110 needn't include the instruction in the message it sends to local node 120, device 110 may receive an indication that messages it sends to local node 120 to instruct local node 120 needn't comprise the instruction in addition to the hash. Such an indication may be received from local node 120 in connection with establishing the connection between device 110 and local node 120, for example. Alternatively, control software configured to control local node 120 may know that including separately also the instruction is unnecessary, and that sending the hash suffices.

Whether including the instruction is necessary may depend on the number of possible instructions, in detail in case the number of possible different instructions device 110 may send to local node 120 is high, deriving the hashes on the local node side may be too arduous. Where pre-calculation is done, memory constraints in local node 120 may limit the possibility to pre-calculate and store hashes. In case of post-calculation, a large number of possible instructions may cause delay between receiving the message from device 110 and acting on the instruction, as local node 120 derives hashes one by one in search of one that matches the one received from device 110.

In response to an instruction from device 110 where the hash verification succeeds, local node 120 may be configured to responsively act on the instruction and to transmit, over the connection, a second message back to device 110. The second message may comprise an acknowledgement and/or result relating to the instruction, and a second random value generated in local node 120. Alternatively, the second random value may be sent from local node 120 to device 110 in an additional message. Should device 110 subsequently send a second instruction to local node 120, a similar process is used as was used with the instruction of the first message, but the second random value is used when calculating the hash.

The second message, sent from local node 120 to device 110, may further comprise a hash derived using as input the secret value and the second random value. Thus device 110 is enabled to check that the second message originates from a node that is in possession of the secret value. In embodiments with a pin code, the pin code may also be used as input when deriving this hash.

Local node 120 may be configured to change the secret value periodically, for example by generating a random value to be used as the new secret value. This increases security as devices seeking control of local node 120 need to obtain the new secret value over the first channel, and cannot rely on a previously obtained secret value.

By changing the random value after each instruction, replay attacks with old instructions are prevented from succeeding since the hashes in old instruction messages no longer match with the random value in use after the old instruction message has been acted on. By using the secret value only obtainable over the local link, the set of devices that can transmit instructions to local node 120 is limited to those devices that are physically close enough to obtain the secret value from local node 120, over the first channel. For example, in case local node is in a hotel room, an office or other access-controlled location, it may be useful to enable control of local node 120 by devices that are physically close. Thus no cryptographic protocol needs to be used for the connection between device 110 and local node 120, which saves computational and memory resources in device 110 and local node 120.

In embodiments that employ the pin code, the changing random value renders pin code guessing attacks significantly slower, as in addition to the pin code, an attacker would need to guess the prevailing random value.

Since obtaining the input data of a hash is difficult by analysing the hash, the hashes may be transmitted between device 110 and local node 120 over a connection that in itself is not encrypted. For example, determining the secret value by eavesdropping on messages exchanged between device 110 and local node 120 would be very difficult owing to mathematical properties of hash functions.

Figure 2:
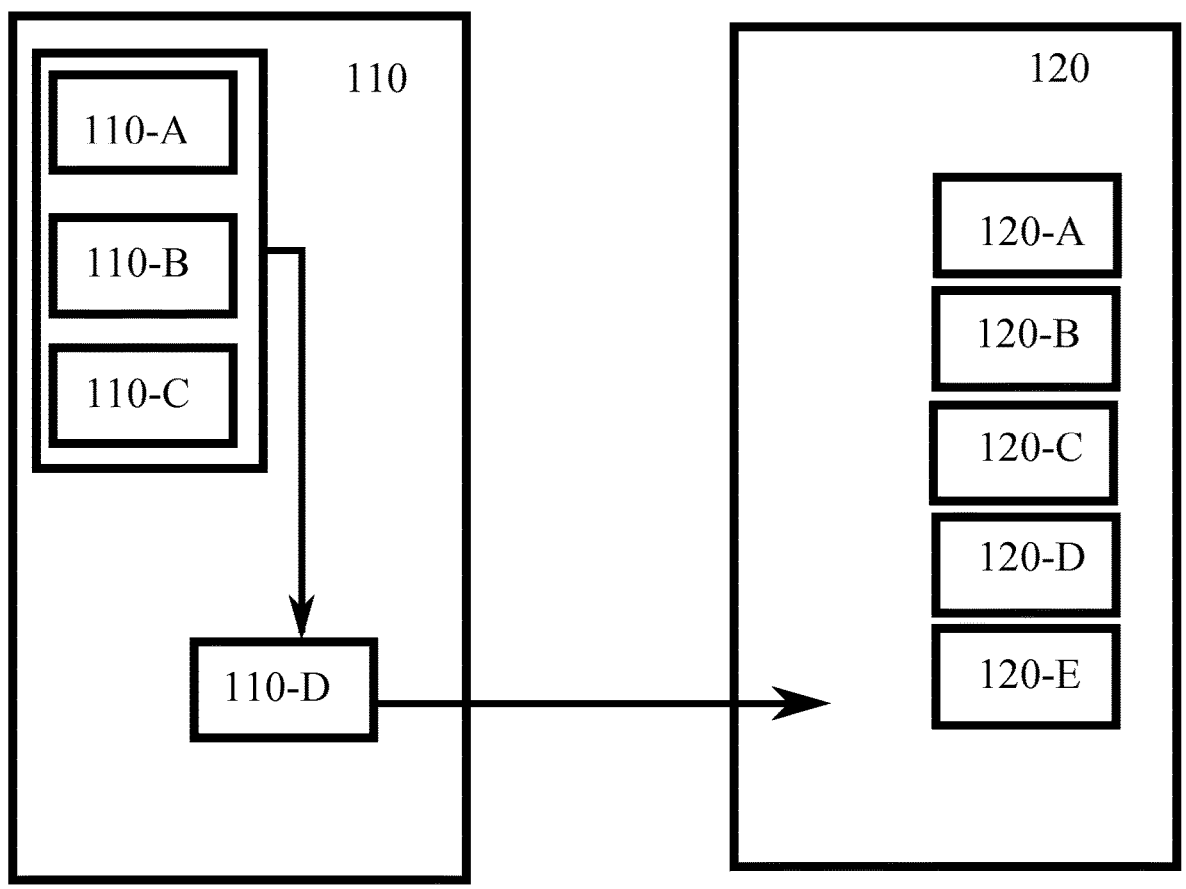
FIG. 2 illustrates an example use case in accordance with at least some embodiments of the present invention.

FIG. 2 illustrates an example use case in accordance with at least some embodiments of the present invention. In the figure are illustrated device 110 and local node 120, which have been described above in connection with FIG. 1. In FIG. 2, local node 120 stores pre-calculated hash values 120-A, 120-B, 120-C, 120-D and 120-E, each of which is derived using a possible instruction. In other words, there are five possible instructions in the example of FIG. 2.

On the device 110 side, device 110 derives hash 110-D from input data which comprises the secret value 110-A, the random value 110-B, and finally the instruction 110-C that device 110 wants local device 120 to carry out. Once hash 110-D has been derived, it is transmitted from device 110 to local node 120. Local node 120 then determines whether the hash 110-D matches any of the pre-calculated hash values, and if so which one, enabling local node 120 to determine which instruction device 110 is instructing local node 120 to carry out.

Figure 3:
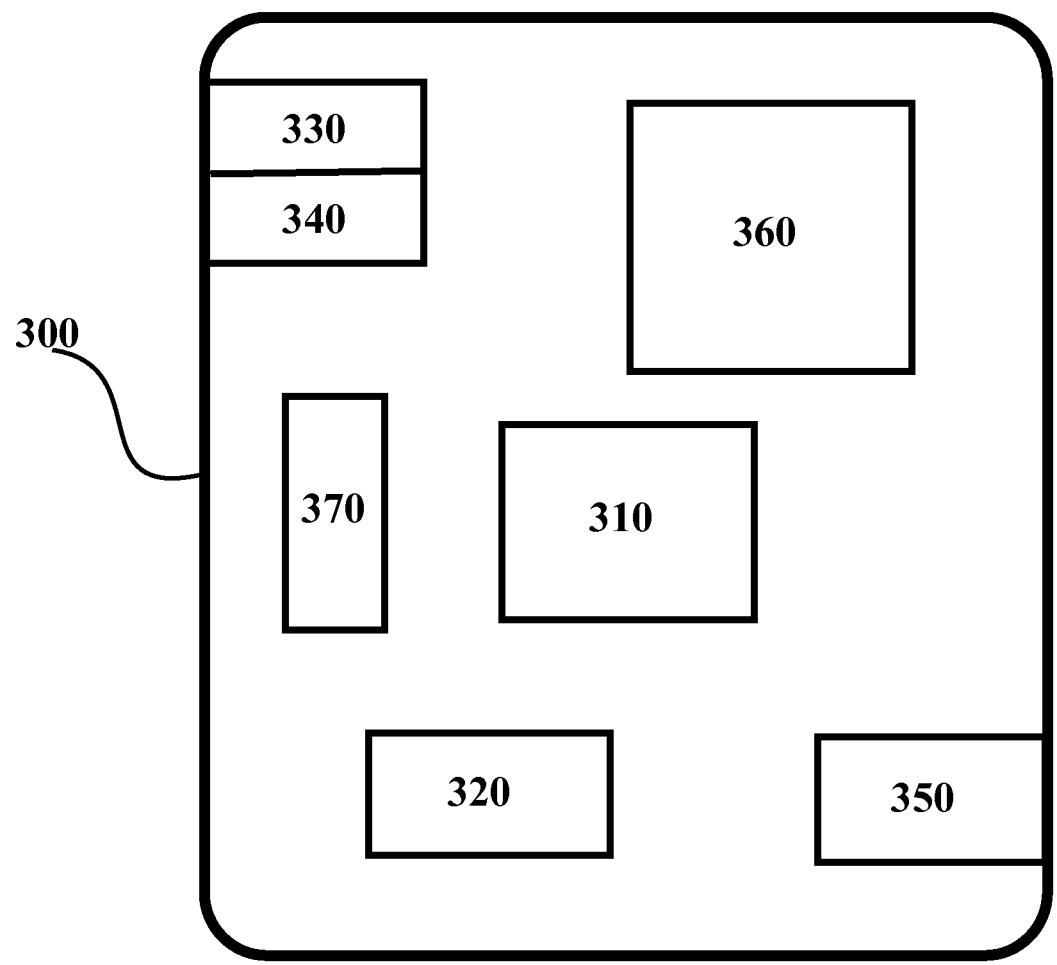
FIG. 3 illustrates an example apparatus capable of supporting at least some embodiments of the present invention.

FIG. 3 illustrates an example apparatus capable of supporting at least some embodiments of the present invention. Illustrated is device 300, which may comprise, for example, device 110 of FIG. 1 or FIG. 2. Comprised in device 300 is processor 310, which may comprise, for example, a single- or multi-core processor wherein a single-core processor comprises one processing core and a multi-core processor comprises more than one processing core. Processor 310 may comprise a Qualcomm Snapdragon 800 processor, for example. Processor 310 may comprise more than one processor. A processing core may comprise, for example, a Cortex-A8 processing core manufactured by Intel Corporation or a Brisbane processing core produced by Advanced Micro Devices Corporation. Processor 310 may comprise at least one application-specific integrated circuit, ASIC. Processor 310 may comprise at least one field-programmable gate array, FPGA. Processor 310 may be means for performing method steps in device 300. Processor 310 may be configured, at least in part by computer instructions, to perform actions.

Device 300 may comprise memory 320. Memory 320 may comprise random-access memory and/or permanent memory. Memory 320 may comprise at least one RAM chip. Memory 320 may comprise magnetic, optical and/or holographic memory, for example. Memory 320 may be at least in part accessible to processor 310. Memory 320 may be means for storing information. Memory 320 may comprise computer instructions that processor 310 is configured to execute. When computer instructions configured to cause processor 310 to perform certain actions are stored in memory 320, and device 300 overall is configured to run under the direction of processor 310 using computer instructions from memory 320, processor 310 and/or its at least one processing core may be considered to be configured to perform said certain actions.

Device 300 may comprise a transmitter 330. Device 300 may comprise a receiver 340. Transmitter 330 and receiver 340 may be configured to transmit and receive, respectively, information in accordance with at least one cellular or non-cellular standard. Transmitter 330 may comprise more than one transmitter. Receiver 340 may comprise more than one receiver. Transmitter 330 and/or receiver 340 may be configured to operate in accordance with global system for mobile communication, GSM, wideband code division multiple access, WCDMA, long term evolution, LTE, IS-95, wireless local area network, WLAN, Ethernet and/or worldwide interoperability for microwave access, WiMAX, standards, for example.

Device 300 may comprise a near-field communication, NFC, transceiver 350. NFC transceiver 350 may support at least one NFC technology, such as NFC, Bluetooth, Wibree or similar technologies.

Device 300 may comprise user interface, UI, 360. UI 360 may comprise at least one of a display, a keyboard, a touchscreen, a vibrator arranged to signal to a user by causing device 300 to vibrate, a speaker and a microphone. A user may be able to operate device 300 via UI 360, for example to accept incoming telephone calls, to originate telephone calls or video calls, to browse the Internet, to manage digital files stored in memory 320 or on a cloud accessible via transmitter 330 and receiver 340, or via NFC transceiver 350, and/or to control a local node such as local node 120 of FIG. 1 or FIG. 2.

Device 300 may comprise or be arranged to accept a user identity module 370. User identity module 370 may comprise, for example, a subscriber identity module, SIM, card installable in device 300. A user identity module 370 may comprise information identifying a subscription of a user of device 300. A user identity module 370 may comprise cryptographic information usable to verify the identity of a user of device 300 and/or to facilitate encryption of communicated information and billing of the user of device 300 for communication effected via device 300.

Processor 310 may be furnished with a transmitter arranged to output information from processor 310, via electrical leads internal to device 300, to other devices comprised in device 300. Such a transmitter may comprise a serial bus transmitter arranged to, for example, output information via at least one electrical lead to memory 320 for storage therein. Alternatively to a serial bus, the transmitter may comprise a parallel bus transmitter. Likewise processor 310 may comprise a receiver arranged to receive information in processor 310, via electrical leads internal to device 300, from other devices comprised in device 300. Such a receiver may comprise a serial bus receiver arranged to, for example, receive information via at least one electrical lead from receiver 340 for processing in processor 310. Alternatively to a serial bus, the receiver may comprise a parallel bus receiver.

Device 300 may comprise further devices not illustrated in FIG. 3. For example, where device 300 comprises a smartphone, it may comprise at least one digital camera. Some devices 300 may comprise a back-facing camera and a front-facing camera, wherein the back-facing camera may be intended for digital photography and the front-facing camera for video telephony. Device 300 may comprise a fingerprint sensor arranged to authenticate, at least in part, a user of device 300. In some embodiments, device 300 lacks at least one device described above. For example, some devices 300 may lack a NFC transceiver 350 and/or user identity module 370.

Processor 310, memory 320, transmitter 330, receiver 340, NFC transceiver 350, UI 360 and/or user identity module 370 may be interconnected by electrical leads internal to device 300 in a multitude of different ways. For example, each of the aforementioned devices may be separately connected to a master bus internal to device 300, to allow for the devices to exchange information. However, as the skilled person will appreciate, this is only one example and depending on the embodiment various ways of interconnecting at least two of the aforementioned devices may be selected without departing from the scope of the present invention.

Figure 4:
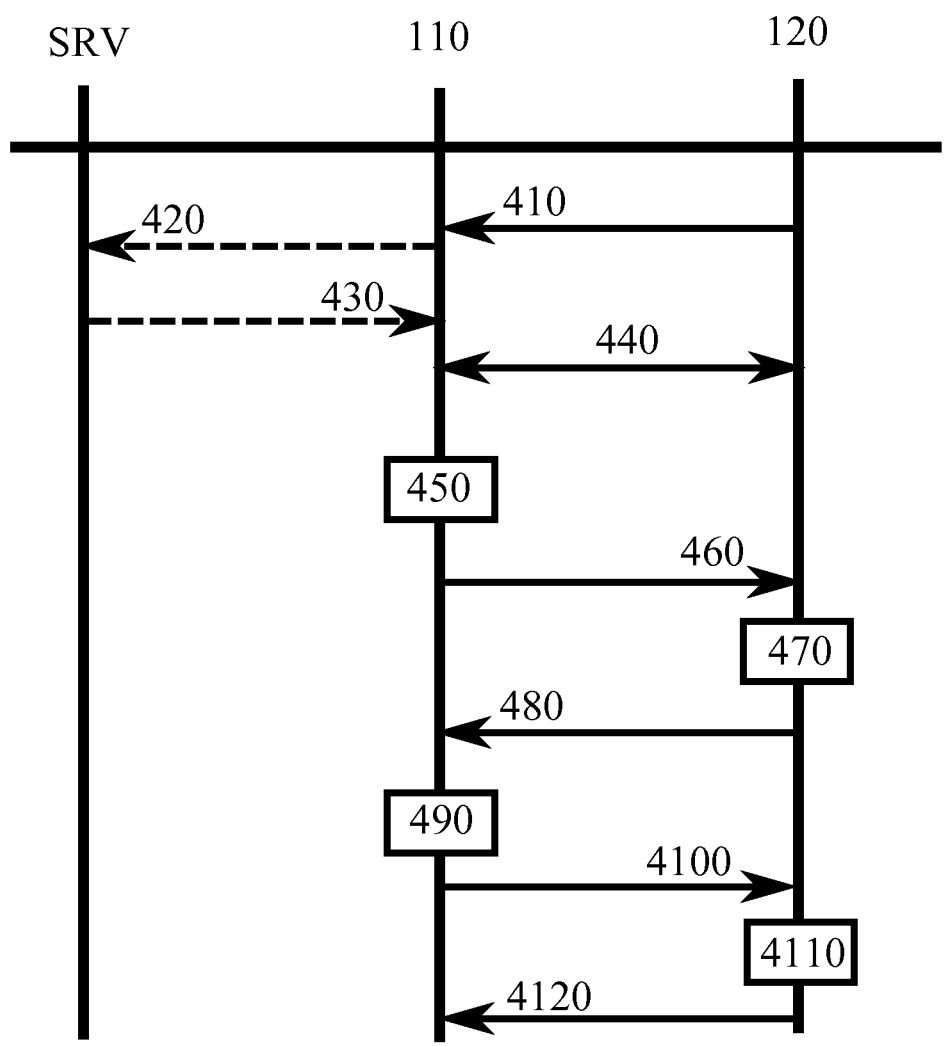
FIG. 4 illustrates signalling in accordance with at least some embodiments of the present invention.

FIG. 4 illustrates signalling in accordance with at least some embodiments of the present invention. On the vertical axes are disposed, from left to right, server SRV, device 110 and local node 120. Device 110 and local node 120 may correspond essentially to like elements discussed above in connection with FIG. 1 and FIG. 2. Server SRV may essentially correspond to the network node discussed above where device 110 may fetch the control software described above. Time advances from top toward the bottom of the figure.

In phase 410, device 110 obtains from local device 120 information over the first channel. This information may comprise the secret value and an identifier of local device 120. Optionally, the information may further comprise a pin code and/or an identifier of server SRV.

In optional phases 420 and 430, device 110 may request and receive, respectively, control software configured to enable control of local node 120. The requesting of phase 420 may be based at least in part on the identifier of the server SRV.

In phase 440, device 110 and local node 120 form a connection, such as for example a protocol connection, such as for example a Websocket connection. In connection with the forming of the connection, local node 120 provides to device 110 a random value. In some embodiments, local node 120 transmits in connection with phase 440 an indication as to whether device 110 needs to transmit an instruction and a hash, or only a hash, when instructing local node 120.

In phase 450, device 110 determines an instruction it desires to send to local node 120. Device 110 derives a hash value based at least in part on the secret value, the random value and the instruction.

In phase 460, device 110 transmits, over the connection, a message comprising the hash, and, optionally, the instruction, to local node 120. In case the number of possible instructions is small enough to enable pre-calculating hashes with all possible instructions on the local node side, device 110 may omit the instruction from the message of phase 460. Device 110 may also omit the instruction in case it has received an indication to this effect in connection with phase 440, as described above.

In phase 470, local node 120 verifies the hash received in phase 460. In case the message of phase 460 comprises the instruction in addition to the hash, local node 120 may derive the hash itself, using at least the secret value, the random value and the instruction, and then compare the received hash to the hash derived in local node 120. In case the received hash matches with the hash derived in local node 120, the instruction used in the hash is verified, and acted upon.

Where the message of phase 460 doesn't comprise the instruction, local node 120 may compare the hash received in phase 460 to hashes derived in local node 120 with different possible instructions. In case the received hash matches with one of the hashes derived in local node 120, the instruction used in the derived hash is verified, and acted upon. The hashes derived in local node 120 may be pre-calculated between phase 440 and phase 460, or they may at least in part be derived after receipt of the message of phase 460.

In phase 480 local node 120 may transmit a message to device 110 informing device 110, explicitly or implicitly, that the instruction of phase 460 was carried out, or alternatively that verification of the hash in the message of phase 460 failed. The message of phase 480 may comprise a second random value.

In phase 490, device 110 determines to send a second instruction to local node 120, and derives a hash using the second random value, the secret, and the second instruction. The derived hash is transmitted to local node 120 in phase 4100. The hash is verified in local node 120 in phase 4110, and in phase 4120 local node 120 informs device 110 concerning acting on the second instruction. The message of phase 4120 may comprise a third random value, for use in a subsequent instruction from device 110 to local node 120.

Figure 5:
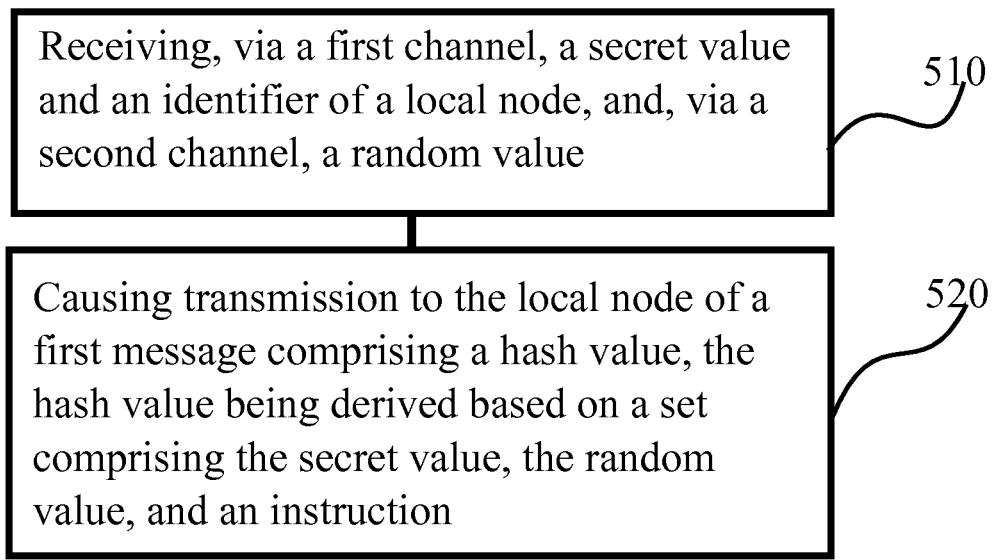
FIG. 5 is a first flow chart of a first method in accordance with at least some embodiments of the present invention.

FIG. 5 is a first flow chart of a first method in accordance with at least some embodiments of the present invention. The phases of the illustrated method may be performed in device 110, or in a control device, such as processor or chipset, configured to at least in part control device 110 when implanted therein.

Phase 510 comprises receiving, via a first channel, a secret value and an identifier of a local node and, via a second channel, a random value. Phase 520 comprises causing transmission to the local node of a first message comprising a hash value, the hash value being derived based on a set comprising the secret value, the random value, and an instruction. The first message may be conveyed to the local node via the second channel.

Figure 6:
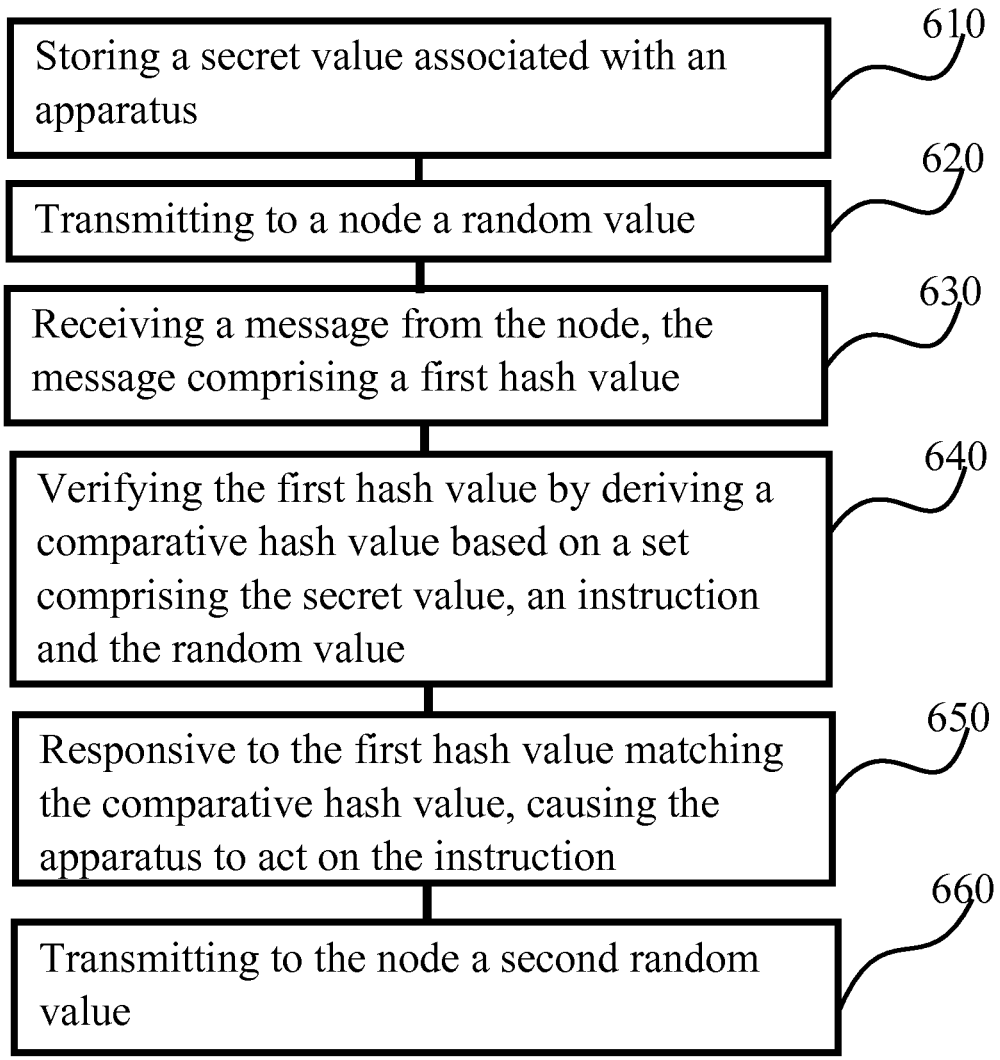
FIG. 6 is a second flow chart of a second method in accordance with at least some embodiments of the present invention.

FIG. 6 is a second flow chart of a second method in accordance with at least some embodiments of the present invention. The phases of the second method may be performed in local node 120, or in a control device, such as processor or chipset, configured to at least in part control local node 120 when implanted therein.

Phase 610 comprises storing a secret value associated with an apparatus. The apparatus may comprise an apparatus performing the second method. Phase 620 comprises transmitting to a node a random value. Phase 630 comprises receiving a message from the node, the message comprising a first hash value. Phase 640 comprises verifying the first hash value by deriving a comparative hash value based on a set comprising the secret value, an instruction, and the random value. Phase 650 comprises, responsive to the comparative hash value matching the first hash value, causing the apparatus to act on the instruction. Finally, phase 660 comprises transmitting to the node a second random value.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the forgoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The invention claimed is:

1. An apparatus comprising:
    at least one receiver configured to receive, via a first channel, a secret value and an identifier of a local node and, via a second channel, a random value, and
    at least one processing core configured to cause transmission to the local node of a first message comprising a hash value, the hash value being derived based on a set comprising the secret value, the random value, and an instruction, wherein
    a pin code is received over the first channel to derive the hash value based further on the pin code.

2. The apparatus according to claim 1, wherein the at least one processing core is configured to derive the hash value.

3. The apparatus according to claim 1, wherein the first channel comprises a Bluetooth channel, a Bluetooth low-energy channel, a near field communication channel, an infra-red channel or a visual pattern recognition channel.

4. The apparatus according to claim 1, wherein the second channel comprises a websocket channel, a hypertext transport protocol channel, a constrained application protocol channel, extensible messaging and presence protocol, message queue telemetry transport, alljoyn or hypertext transport protocol channel 2.0 channel.

5. The apparatus according to claim 1, wherein the at least one processing core is configured to cause the first message to be transmitted via the second channel.

6. The apparatus according to claim 1, wherein the at least one processing core is further configured to cause transmission of a second message to the local node, the second message comprising a second hash value, the second hash value being derived based on a set comprising the secret value, a second random value, and a second instruction, the second random value being received in the apparatus from the local node at least in part as a response to the first message.

7. The apparatus according to claim 1, wherein the at least one receiver is further configured to receive, via the first channel, an identifier of a network node and the at least one processing core is configured to request, from the network node, control software configured to cause controlling of the local node, wherein the request comprises the identifier of the local node.

8. The apparatus according to claim 1, wherein the identifier of the local node comprises an internet protocol address of the local node, a fully qualified domain name of the local node or a pointer to a websocket proxy.

9. The apparatus according to claim 1, wherein the at least one processing core is configured to process, in the apparatus, an indication concerning whether it is necessary to include the instruction in the message.

10. An apparatus comprising at least one processing core and at least one memory including computer program code, the at least one memory and the computer program code being configured to, with the at least one processing core, cause the apparatus at least to:
    store a secret value associated with the apparatus;
    transmit to a node a random value;
    receive a message from the node, the message comprising a first hash value;
    verify the hash value by deriving a comparative hash value based on a set comprising the secret value, an instruction, and the random value, wherein
    the secret value is provided to the node over a first channel,
    the message from the node is received over a second channel, and
    the comparative hash value is derived based at least in part on a pin code provided to the node from the apparatus via the first channel;
    responsive to the comparative hash value matching the first hash value, cause the apparatus to act on the instruction; and
    transmit to the node a second random value.

11. The apparatus according to claim 10, wherein the message comprises, in addition to the first hash value, the instruction.

12. The apparatus according to claim 10, wherein the at least one memory and the computer program code are configured to, with the at least one processing core, cause the apparatus to periodically change the secret value.

13. The apparatus according to claim 10, wherein the at least one memory and the computer program code are configured to, with the at least one processing core, cause the apparatus to derive, after transmitting the random value to the node, at least two comparative hash values using at least two possible values for the instruction.

14. The apparatus according to claim 10, wherein the at least one memory and the computer program code are configured to, with the at least one processing core, cause the apparatus to transmit to the node a second random value responsive to receipt of the message.

15. A method, comprising:
    storing a secret value associated with an apparatus;
    transmitting to a node a random value;
    receiving a message from the node, the message comprising a first hash value;

verifying the first hash value by deriving a comparative hash value based on a set comprising the secret value, an instruction, and the random value, wherein the secret value is provided to the node over a first channel, the message from the node is received over a second channel, and the comparative hash value is derived based at least in part on a pin code provided to the node from the apparatus via the first channel;

responsive to the comparative hash value matching the first hash value, causing the apparatus to act on the instruction; and transmitting to the node a second random value.

16. The method according to claim 15, further comprising pre-calculating, after transmitting the random value to the node, at least two comparative hash values using at least two possible values for the instruction.

\* \* \* \* \*